United States Patent [19]

Harmuth

[11] Patent Number: 5,148,174
[45] Date of Patent: Sep. 15, 1992

[54] SELECTIVE RECEPTION OF CARRIER-FREE RADAR SIGNALS WITH LARGE RELATIVE BANDWIDTH

[75] Inventor: Henning F. Harmuth, Potomac, Md.

[73] Assignee: Geophysical Survey Systems, Inc., North Salem, N.H.

[21] Appl. No.: 654,498

[22] Filed: Feb. 13, 1991

[51] Int. Cl.$^5$ ............................................. G01S 7/28
[52] U.S. Cl. ........................................................ 342/21
[58] Field of Search ............................................ 342/21

[56] References Cited

U.S. PATENT DOCUMENTS

| | | | |
|---|---|---|---|
| 3,686,669 | 8/1972 | Toulis | 342/21 |
| 4,150,375 | 4/1979 | Ross et al. | 342/21 |
| 4,907,001 | 3/1990 | Harmuth | 342/21 |

*Primary Examiner*—Mark Hellner
*Attorney, Agent, or Firm*—Wolf, Greenfield & Sacks

[57] ABSTRACT

A method for generating a sequence of short radar pulses and a method plus apparatus for detecting those same short pulses when backscattered, even though they are heavily distorted by a target and have additive noise and unwanted signals superimposed on them. The method applies to pulses of long or short duration, including durations of 1 nanoseconds (1 ns) or less. The pulses are transmitted without the fine structure marking of a sinusoidal wave carrier, but organized into a coarse structure that results from incorporating them within a highly unconventional type of character, wherein a plurality of positive-going and negative-going pulses are transmitted such that each pulse is spaced apart from its neighbors. Each pulse is short, so the return signal is highly distorted. The sequence of positive-going and negative-going pulses are organized into a pattern of non-contiguous pulses that constitute a new type of "character", which may be thought of as a "spaced-apart-character". This "spaced-apart-character" is organized into a large coarse structure marking, so that a) the total transmitted energy is large, b) a receiver can selectively distinguish the wanted return signal from noise and unwanted signals, and c) reflections from targets longer than $L = \Delta tc/2$ are rejected.

13 Claims, 12 Drawing Sheets

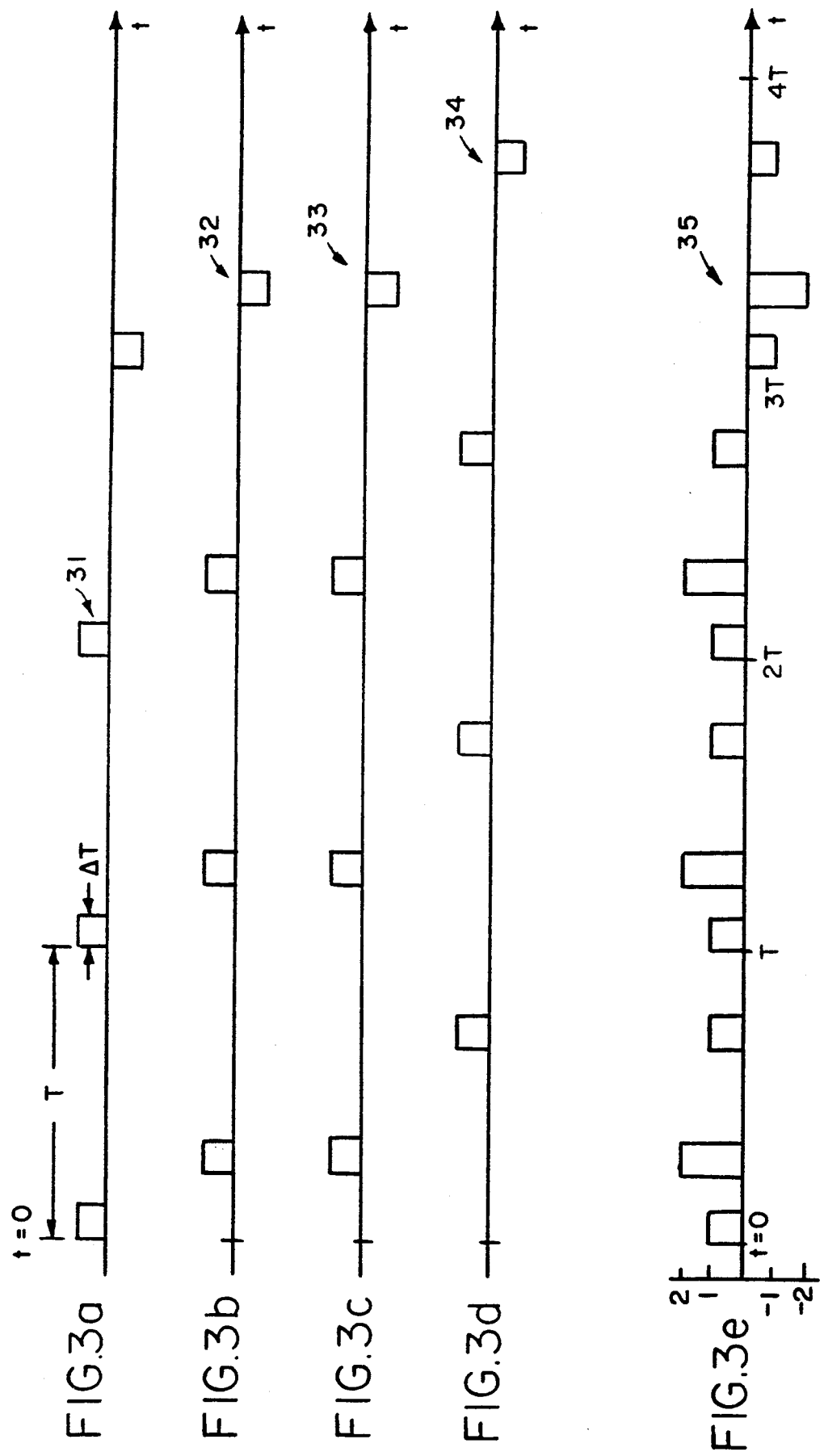

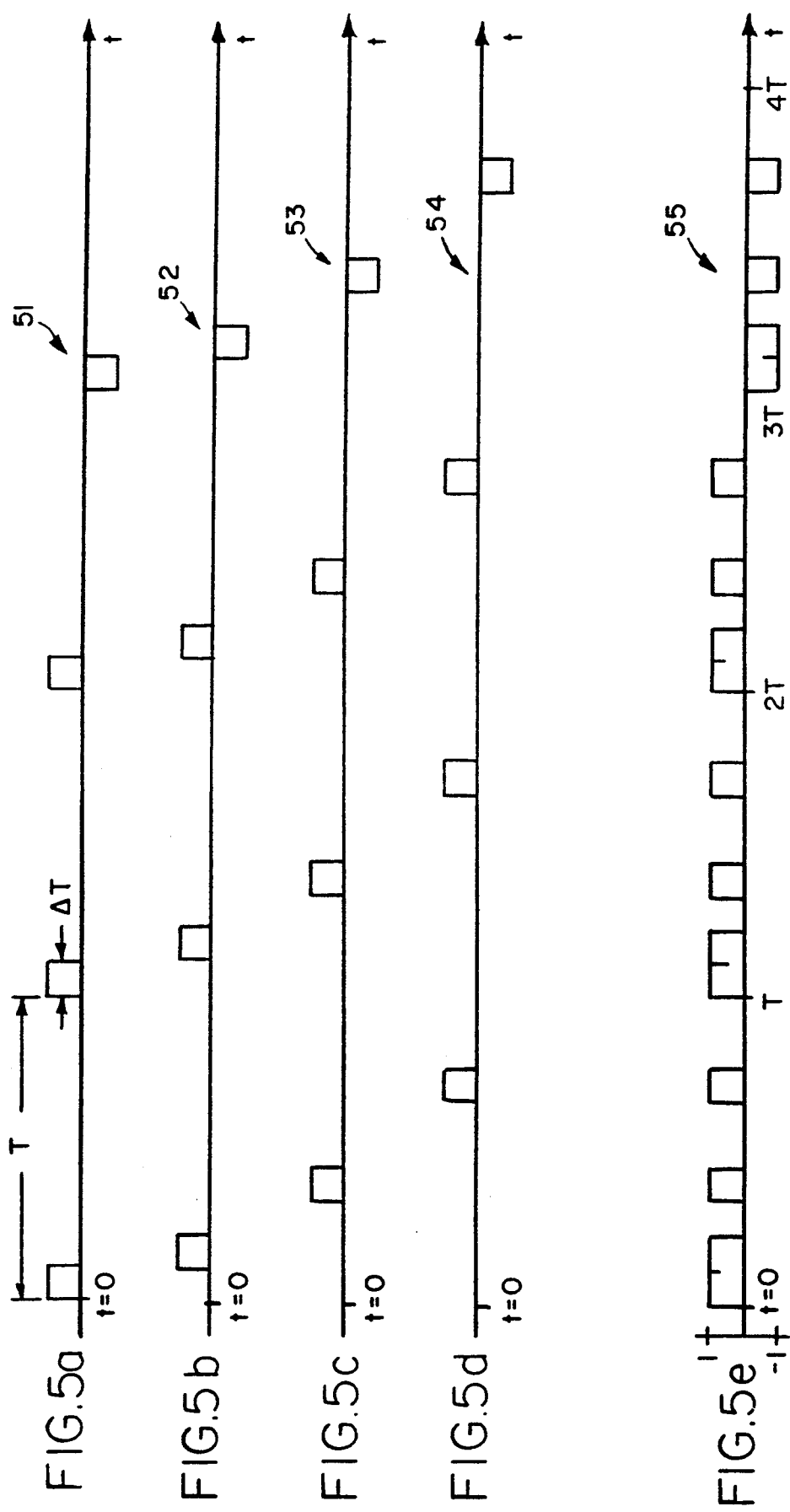

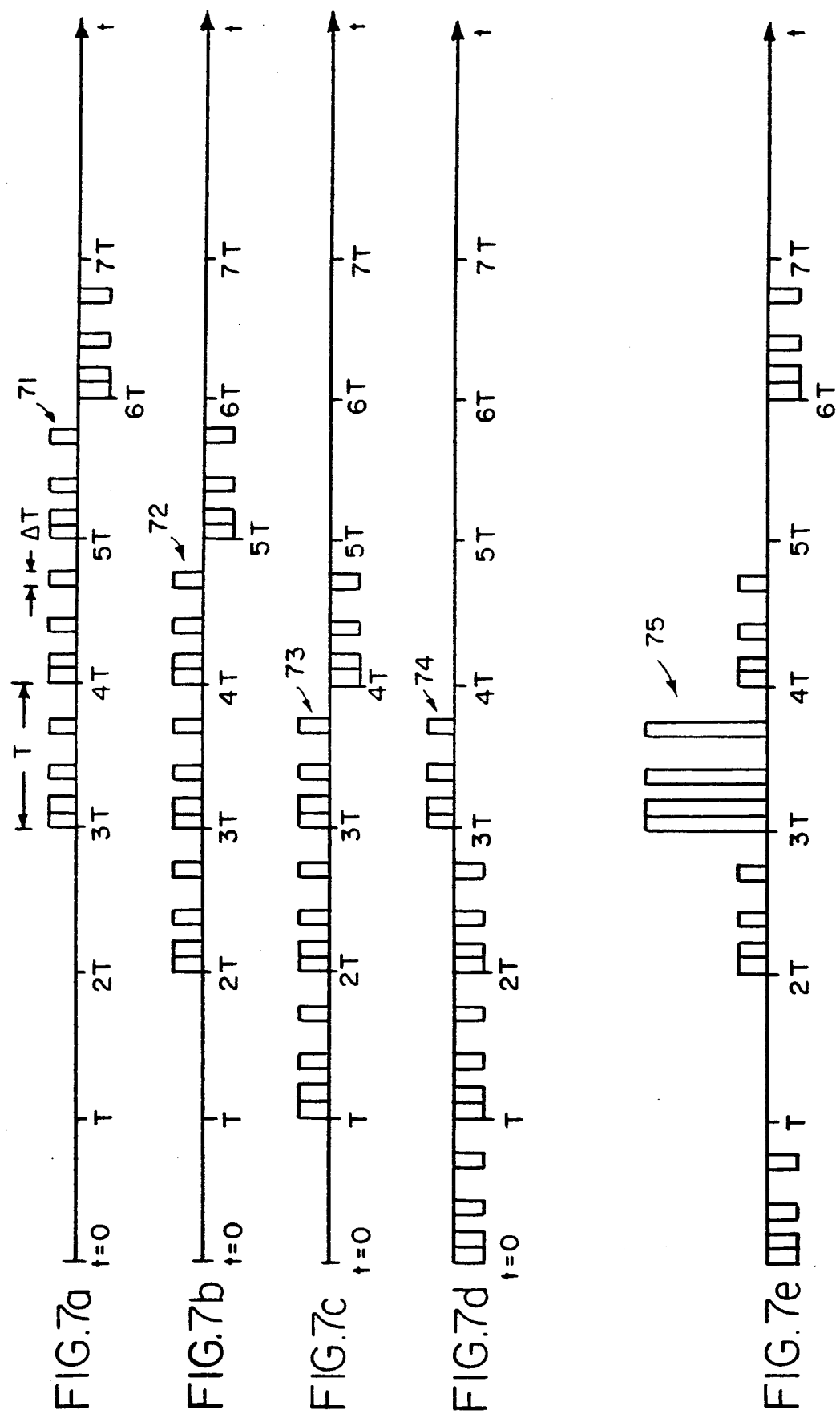

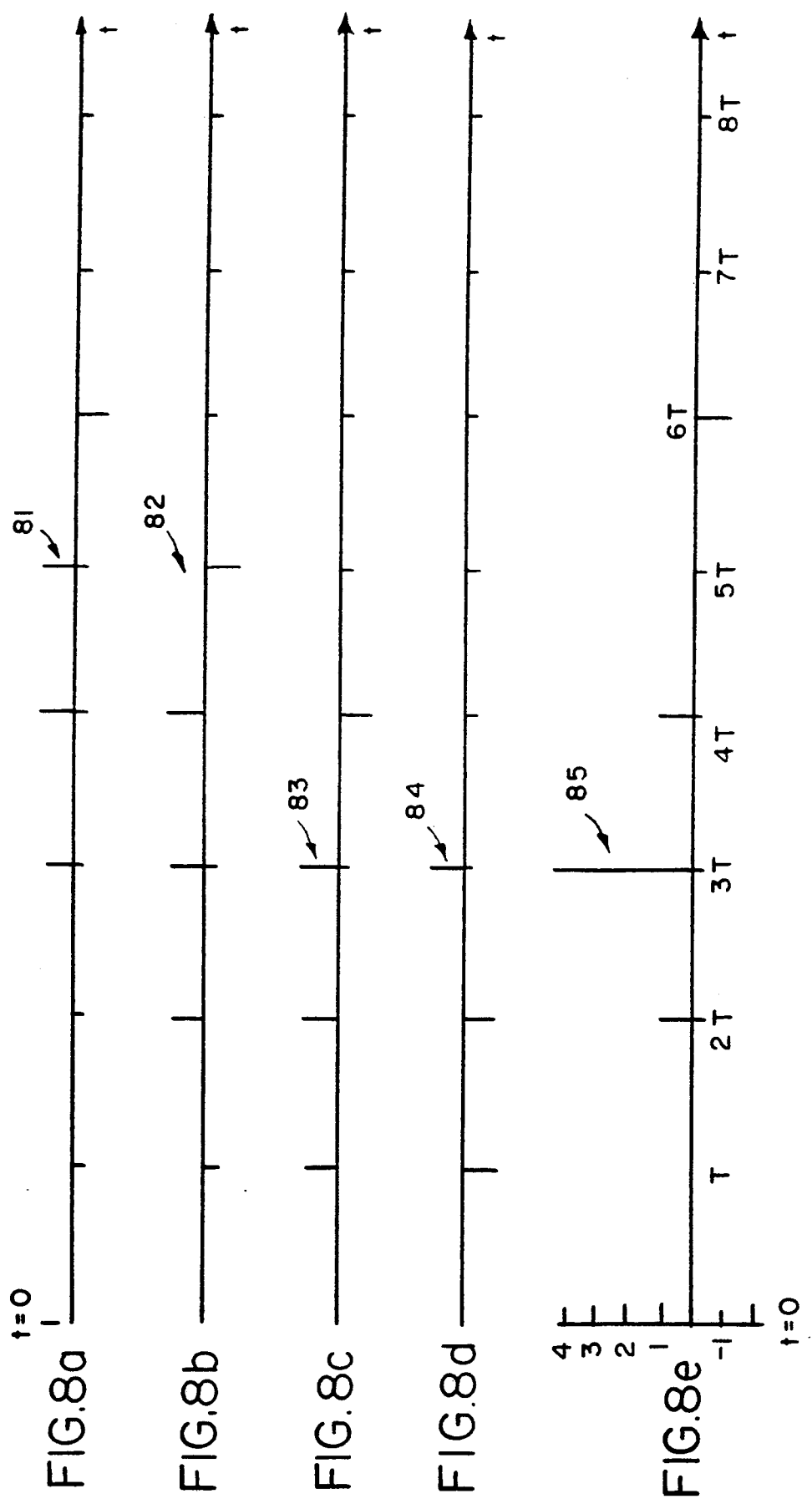

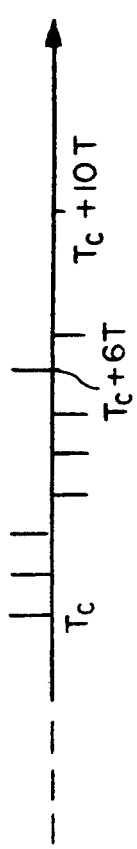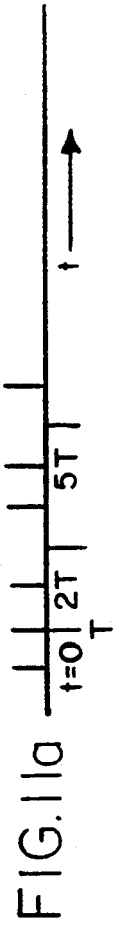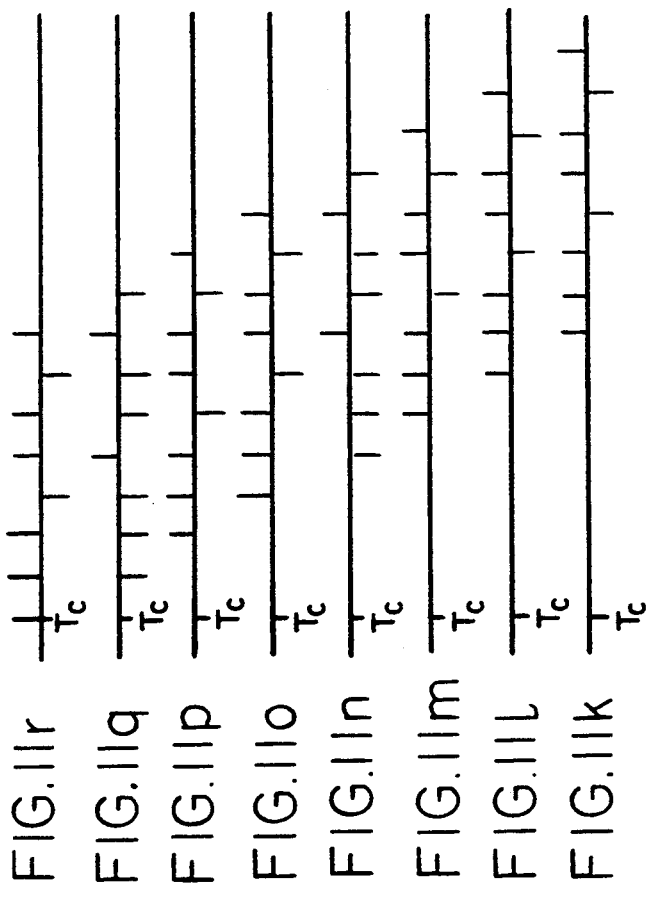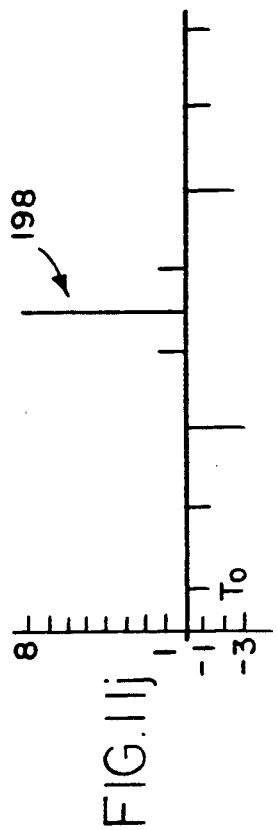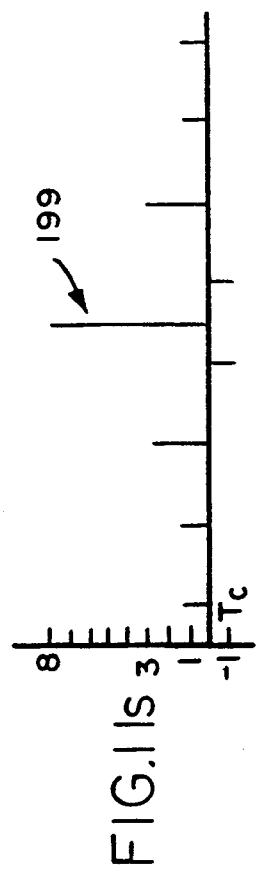

SELECTIVE RECEPTION OF CARRIER-FREE RADAR SIGNALS WITH LARGE RELATIVE BANDWIDTH

FIELD OF THE INVENTION

This invention relates to the selective reception of short carrier-free radar pulses, that are returned after being heavily distorted by a target. More particularly, a method and apparatus are taught for position coding pulses which achieves the dual goals of facilitating the transmission of short pulses through the atmosphere and enabling selective reception of the returned signal.

BACKGROUND OF THE INVENTION

In most applications of radar, both noise and unwanted signals are present due to other radars or radio transmitters in the area. An important consideration is how to distinguish the wanted return signal from both noise and unwanted signals. In theory, the transmitter could radiate so much energy that the returned signals would be much larger than any noise or unwanted signals. However, that would only work for one radar in any given area, so it is not a practical option. Other means of recognizing the wanted return signal have been devised.

Traditionally, a radar signal consists of a burst of 100 to 1000 cycles of a fixed frequency sine wave. As an example, if the carrier frequency is 333 MHz, then one cycle is 3 nanoseconds long, and the duration of a 100 cycle burst is 300 nanoseconds. An electromagnetic wave would travel approximately 100 meters during such a 300 ns burst. If the largest linear dimension of a target is small compared to 100 meters, then the target acts like a point scatterer and the returned pulse will have essentially the same amplitude versus-time variation as the transmitted pulse.

But, with pulses of very short duration (e.g., 1 ns), few targets can be considered as point scatterers. Consequently, such short pulses become heavily distorted. Distortions of the returned pulse, due to the finite extension of the target, are called the radar signature. In principle, the radar signature can provide information about such features as the shape of the target and the material composition of its surface. So on the one hand, a heavily distorted signal is good, in that it means that more information is available about the shape and composition of the target. But, on the other hand, it makes the return signal hard to recognize and selectively receive.

When the pulses incorporate a carrier frequency, reception is facilitated because the carrier frequency (i.e., the fine structure marking) can always be recognized, regardless of the amount of distortion. This is due to the fact that, the sum of any number of sinusoidal waves at a given frequency will always be a sinusoidal function at that same frequency, regardless of the amplitude and phase differences of the various sine waves. Hence, a sequence of bursts with enough sinusoidal cycles per burst to allow detection can be recognized by their carrier frequency regardless of the distortions. But, it is generally not useful to consider using fine structure marking, as provided by a carrier, with pulses that are 1 ns or less. This is because a burst of 1 ns or less would require a carrier frequency of 94 GHz or more to obtain 100 cycles within the burst, and electromagnetic waves at such high frequencies are too strongly absorbed by rain and fog to permit all weather operation. Even in clear weather, the absorption in the atmosphere limits the useful range of a 100 GHz signal to about 20 km. So new schemes must be devised.

Recently, radars have been developed both theoretically and experimentally that do not rely on bursts of a sinusoidal carrier. These radars typically use digital pulses with a duration of 1 ns or less and require special antennas such as shown in my U.S. Pat. No. 4,506,267, titled FREQUENCY INDEPENDENT ANTENNA, and which is hereby incorporated by reference. The return signals from such short duration pulses yields enormous amounts of information about the target. The various mathematical methods for extracting the information are known under the generic term "inverse processes." These methods are not a topic of this disclosure and are, therefore, not discussed herein. However, to make use of this information the radar must first have means that permit the selective reception of the wanted, distorted signal in the presence of both unwanted signals and noise. But, such selective reception is difficult. For instance, if the longest dimensions L of the target (e.g., the length or the wingspan of an airplane) is greater than $\Delta tc/2$ (i.e., where c is the velocity of light, and $\Delta T$ is the duration of the pulse), then the radar signature is large, and distortion of the transmitted signal is great. In such a case, selective reception of the backscattered signal is difficult because it is so different from the transmitted signal. Yet, by carefully choosing the coarse structure of the radiated pulses, certain characteristics will remain unchanged, while others will be strongly effected by the target. The unchanged features can be used to aid selective reception, the changed features constitute the information about the target.

Hence, it is evident that for very short pulses, fine structure marking is impractical. Coarse structure marking can be relied upon to assist in reception instead. The remainder of this disclosure will show how marking with a fine structure can be replaced by marking with a coarse structure to enable the reception of heavily distorted signals, and also to permit long range all weather operation. This disclosure is a further improvement of concepts presented in the patent application "Detection of Radar Signals with Large Radar Signature in the Presence of Noise", Ser. No. 07/647,788, filed Jan. 30, 1991 by Henning Harmuth, which is hereby incorporated by reference.

SUMMARY OF THE INVENTION

Accordingly, it is an object of this invention to present a novel concept for coarse structure marking. The structure simultaneously enables very short radar pulses to be recognized even when they are highly distorted by the target, and facilitates the rejection of return signals from large unwanted targets.

It is another object of this invention to obtain information about the shape and material composition of radar targets using very short radar pulses, where the maximum dimensions of all anticipated targets are less than a predetermined value.

It is still a further object of this invention to facilitate the rejection of return signals from targets that are larger than the anticipated maximum dimensions of targets of interest.

It is another object of this invention to facilitate long range all weather radar using very short radar pulses.

It is a further object of this invention to permit the selective reception of heavily distorted signals in the presence of unwanted signal and noise, without using a sinusoidal carrier.

It is still a further object of this invention to enable the transmission of very short radar pulses through the atmosphere and simultaneously permit the selective reception of heavily distorted return signals in the presence of unwanted signal and noise using non contiguous pulses, without the use of a sinusoidal carrier.

It is a further object of this invention to replace the fine structure marking of a sinusoidal carrier, with coarse structure marking that is much larger than that of any single pulse.

Another object of this invention is to produce a radar signal with coarse structure by using a unique type of pulse position coding involving non-contiguous pulses.

Still another object is to define a unique type of character wherein the pulses that make up the character are separated by spaces and, therefore, not contiguous, as they are in the prior art understanding of characters.

The foregoing and other objects are achieved by transmitting short pulses without the fine structure marking of a sinusoidal wave carrier, but organized into a coarse structure that results from incorporating them within a highly unconventional type of character. A sequence of pulses is transmitted wherein each pulse is spaced apart from its neighbors. Each pulse is short, so the return signal is highly distorted. The pulses are organized into a pattern that constitutes a new type of "character", which may be thought of as a "spaced-apart-character". This "spaced-apart-character" is organized into a large coarse structure marking, so that a) the total transmitted energy is large, b) a receiver can selectively distinguish the wanted return signal from noise and unwanted signals, and c) reflections from targets longer than $L = \Delta t c/2$ are rejected. The invention will be better understood from the detailed description below, which should be read in conjunction with the accompanying drawing.

BRIEF DESCRIPTION OF THE DRAWING

In the drawing:

FIG. 3a is a diagramatic illustration of the + + + − character of FIG. 2b modified by spacing each pulse to form the spaced-character +0+0+0−;

FIGS. 3b, 3c, 3d and 3e are the amplitude-versus-time representations of the signals returned from the scattering points of FIG. 2a, when the spaced-character +0+0+0− of FIG. 3a is incident from direction 20;

FIGS. 5b, 5c, 5d and 5e are the amplitude versus-time plots of the returned signals, when the radar signal of FIG. 3a is incident on the points of FIG. 4 from direction 20;

FIGS. 7a, 7b, 7c 7d and 7e are amplitude-versus-time representations of the signal at different nodes within the hardware circuit of FIG. 6;

FIG. 8a–8e are a simplified representation of FIGS. 7a–7e;

FIG. 11a is an amplitude-versus-time representation of a signal composed of the two complementary waveforms of FIGS. 9c and 9d;

FIG. 11b through FIG. 11i are the waveforms at points 151–158 of FIG. 10 when the first half of FIG. 11a is the input;

FIG. 11k through FIG. 11r are the waveforms at points 161–168 of FIG. 10 when the second half of FIG. 11a is the input;

FIG. 11j is the waveform at point 159 of FIG. 10 when the first half of FIG. 11a is the input;

FIG. 11s is the waveform at point 169 of FIG. 10 when the second half of FIG. 11a is the input;

DETAILED DESCRIPTION

Figure 1:
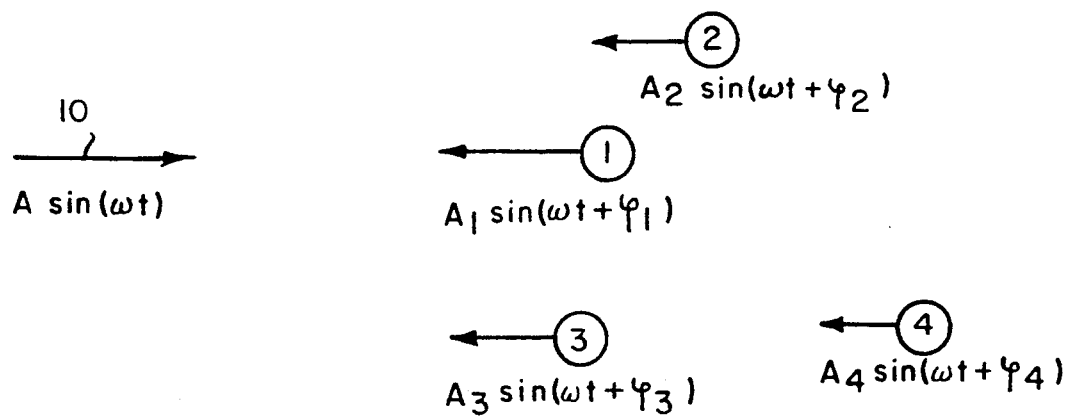
FIG. 1 is a diagramatic illustration showing the backscattering of an incident periodic sinusoidal wave by four scattering points.

FIG. 1 shows a periodic sinusoidal wave, $A\sin(\omega t)$, transmitted along path 10, and striking a target represented by four small scattering points 1, 2, 3 and 4. Each scattering point returns a sinusoidal wave with the same frequency $\omega$ but with amplitude $A_i$ and phase $\phi_i$, where $i = 1, 2, 3, 4$. The sum of these four waves can be represented as:

$$A_o \sin(\omega t + \phi_o) = \sum_{i=1}^{4} A_i \sin(\omega t + \phi_i).$$

The amplitude $A_o$ and the phase $\phi_o$ will depend on the relative position, as well as the number of scattering points, but the frequency $\omega$ will not be changed. A frequency-selective receiver tuned to the frequency $\omega$ can discriminate the backscattered wave from waves with other frequencies including waves caused by noise. Although this result applies only to periodic sinusoidal waves, in practice it can be applied to sinusoidal bursts having sufficiently many cycles rather than infinitely many cycles. In radar, sufficiently many typically means 100 or more cycles.

Figure 2A:
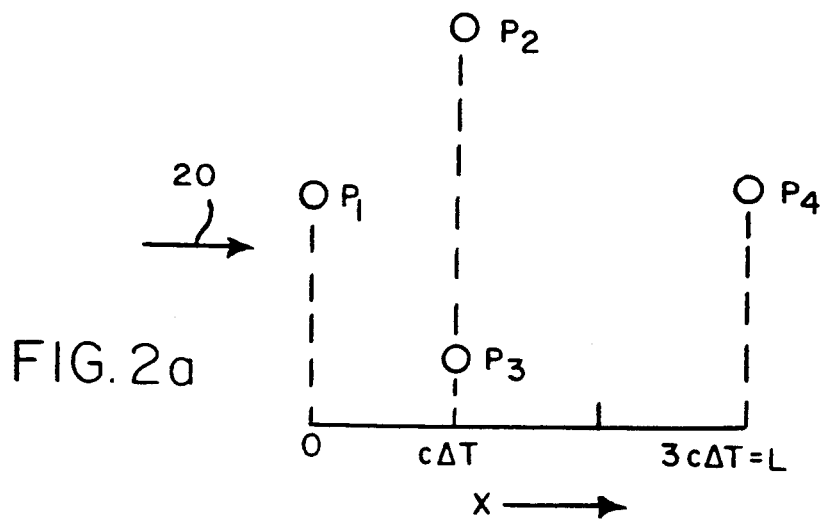
FIG. 2a is a diagramatic illustration showing four point scatterers situated to represent the extremes of the fuselage and the wingtips of an aircraft.
Figure 2B:
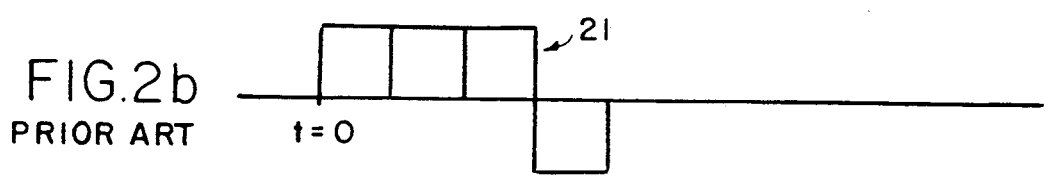
FIGS. 2b, 2c, 2d and 2e are the amplitude-versus-time representations of the signals returned from each of the four scattering points of FIG. 2a, respectively, when the character + + + − is incident on those points from direction 20.

Now consider a nonsinusoidal signal consisting of a sequence of contiguous pulses (i.e., a character), as shown by the waveform 21 in FIG. 2b. This is the time variation of a wave radiated by a carrier-free radar, wherein no sinusoidal carrier is used as a fine structure marking. In practice, it is difficult to radiate a wave with a DC component. But, this problem can be solved by using longer pulse sequences that have no DC component, such as character 21 followed by an amplitude inverted character 21, or character 21 followed by a long, slightly negative pulse.

Figure 2C:
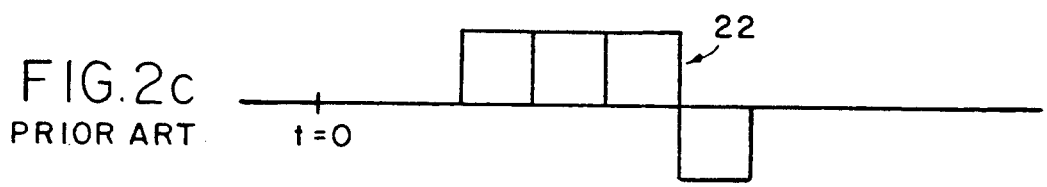
Figure 2D:
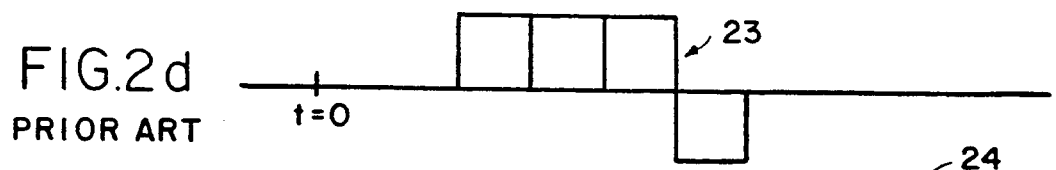
Figure 2E:
Figure 2F:
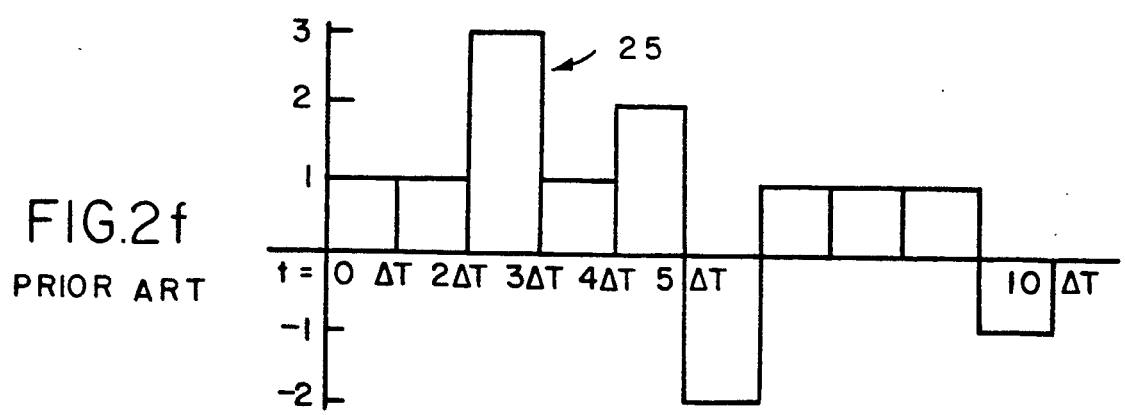
FIG. 2f is the amplitude-versus-time representation of the sum of the return signals of FIGS. 2b, 2c, 2d and 2e.

Let the radiated character reach the four scattering points P1, P2, P3 and P4 of FIG. 2a from direction 20. All four scattering points are assumed to be equally large. First, point P1 returns the signal at time t=0, as shown in FIG. 2b. After a delay of 2ΔT, the points P2 and P3 return the waveforms 22 and 23 shown in FIG. 2c and 2d. It takes 2ΔT rather than ΔT to return since the wave must travel the distance cΔT twice, (i.e., where c is the speed of light in the medium) relative to signal 21. Finally, scattering point P4 returns the waveform 24 shown in FIG. 2e after a delay of 6ΔT relative to waveform 21. Waveform 25 in FIG. 2f is the sum of the four waveforms 21-24. Waveform 25 is what a receiver would see if the backscattered signal were received without noise or unwanted signals.

The backscattered signal 25 of FIG. 2f has a large radar signature, which is desirable, but it has no evident feature to indicate that it was produced by a transmitted signal looking like that of waveform 21. Hence, it is impossible to receive this signal selectively. The receiver can neither reject other signals, nor distinguish this signal from spurious signals. Something must be done to make signal 25 of FIG. 2f selectively receivable. One method of achieving this goal is described in my patent application titled "Detection of Radar Signals with Large Radar Signature in the Presence of Noise", Ser. No. 07/647,788, filed Jan. 30, 1991, which was previously incorporated by reference. However, in this application I disclosed a different method of selective reception of short pulses. The new method involves transmitting a sequence of short pulses that does not involve grouping them together contiguously as a character. The pulses of this invention are transmitted with large intervals between each pulse.

Consider a transmitted signal 31 with the amplitude-versus-time plot of FIG. 3a. Waveform 31 can be thought of as the pulses of a Barker code character (i.e., FIG. 2b), but separated by intervals of duration $T-\Delta T=T_i$. However, in this new method, the character $+++-$ is made into the non-contiguous "spaced apart-character" 31, $+0+0+0-$. The reflected signals 31, 32, 33, and 34, shown in FIGS. 3a, 3b, 3c, and 3d will have the same spacing as the transmitted signal, as will the resultant waveform 35 shown in FIG. 3e.

By inspecting received waveform 35, it is apparent that the pulse pattern in each of the first three time intervals of duration T are alike and the pattern in the forth interval would be the same except that its polarity is reversed. Thus, it is evident that the overall pattern of the character, $+0+0+0-$, is invariant, and, therefore, can be used in the receiver for discrimination.

The pulse pattern within each of the of the intervals of duration T is the radar signature of the target. It is apparent from FIG. 3e that if the backscatter is delayed by more than the duration of the interval $T_i$, then the method will fail. This can be used as a positive feature by selecting $T_i$ to include targets of interest, but to exclude all larger targets. Thus, it is an interesting feature of this new type of character that it can be designed to exclude targets that are larger than all targets of interest.

It is well known that, if L is the longest linear dimension of a target in the direction of propagation of an incident pulse (e.g., the length of the fuselage or wingspan of an aircraft), the backscatter from the farthest point will start to arrive at a time $t_{max}$ after the arrival of the beginning of its signature, where $t_{max}$ is given by:

$$t_{max} = 2L/c \qquad (1)$$

Thus, the structure of this new type of character implies that if the reflecting target is larger than L (i.e., greater than $cT_i/2$), then the selective reception will either reject or discriminate out the returned signal. This feature can be used to great advantage. Consider a look down radar that is set to only recognize targets of length L=10 m or less. Assume that $T_i$ is chosen based on L=10 m. Equation 1 indicates that making:

$$T_i = 2 \times 10/3 \times 10^{-8} = 6.67 \times 10^{-8} s = 66.7 \text{ ns} \qquad (2)$$

will enable the transceiver to reject targets longer than 10 m. Examples of a "longer target" are the surface of the Earth, the surface of the ocean, a weather front or rain. Hence, a new method has been shown for clutter suppression.

Figure 4:
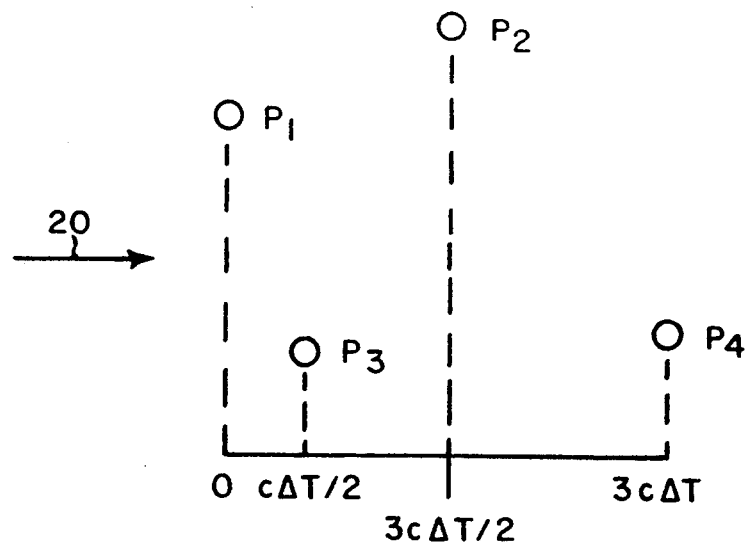
FIG. 4 is a diagramatic illustration of the same four points shown in FIG. 2a, but rotated relative to direction 20.

For a further explanation of the method refer to FIG. 4. FIG. 4 shows the four scattering points of FIG. 2 rotated relative to the incident wave 20. Consequently, the four signals 51, 52, 53, 54 shown in FIGS. 5a-5d are reflected off each of the related points $P_1$, $P_2$, $P_3$ and $P_4$, respectively. The received backscattered signal 55 shown in FIG. 5e is the sum of waveforms 51-54. A comparison of waveform 55 in FIG. 5e with waveform 35 FIG. 3e shows that the basic $+0+0+0-$ pattern of the pulses of the four time intervals still remains unchanged. But, the pattern of pulses within each time interval of duration T has changed. In other words the radar signature has changed, but the coarse structure marking the transmitted signal has not changed.

Figure 6:
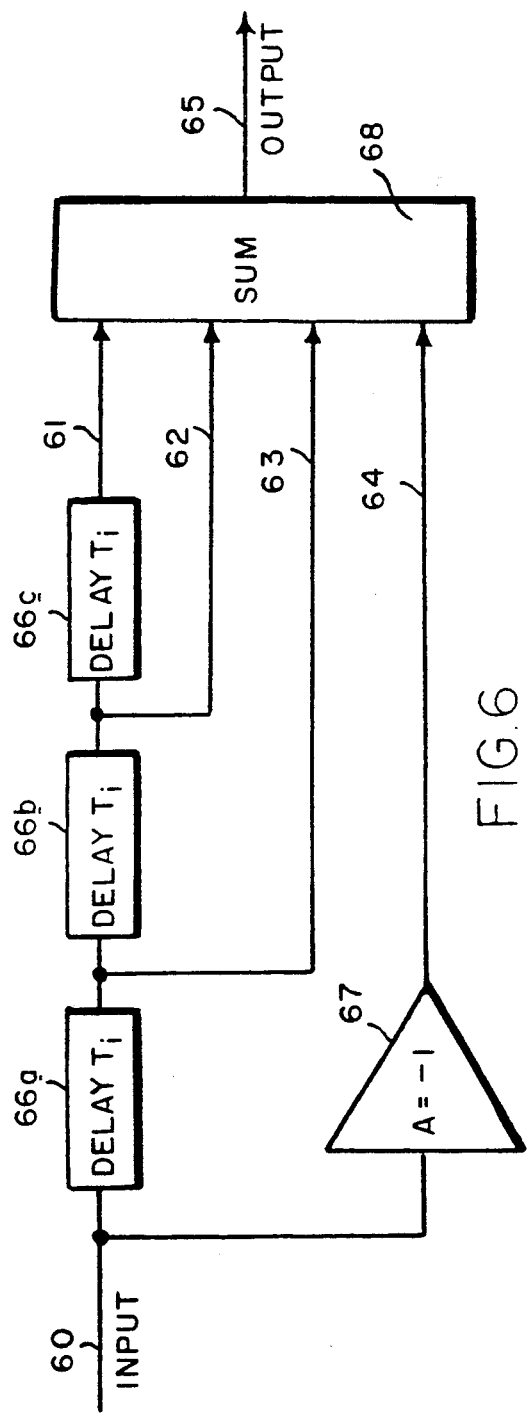
FIG. 6 is a block diagram of a circuit that selectively signals.
Figure 7F:
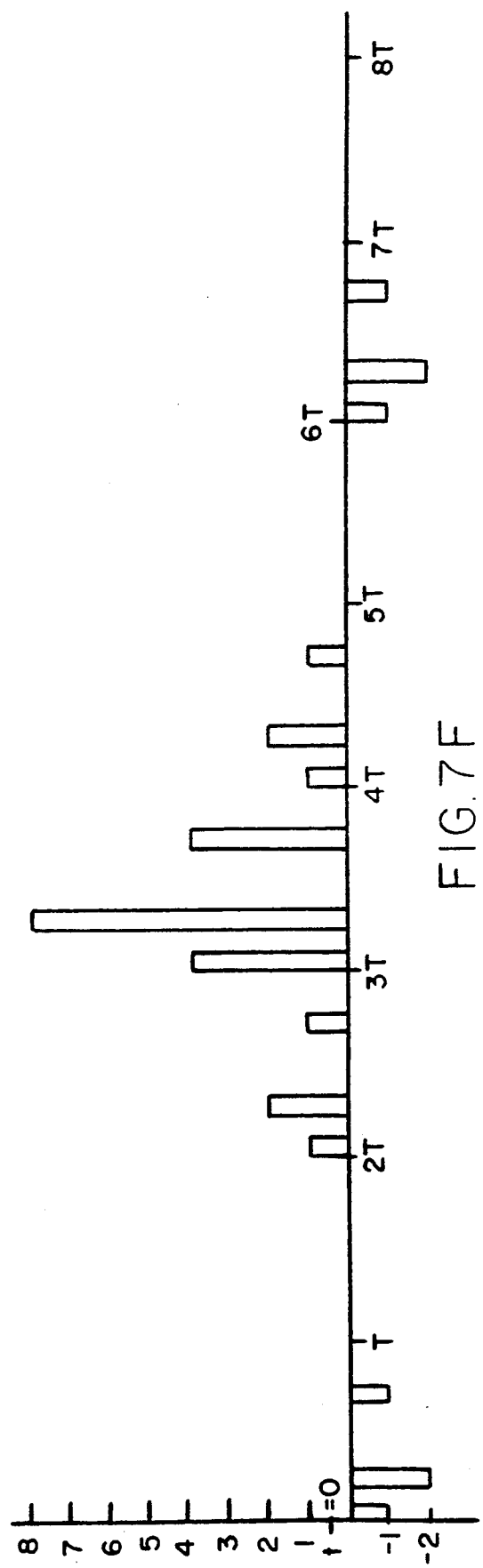
FIG. 7f is the amplitude-versus-time representation of the output of the circuit of FIG. 6.

If the signal 55 of FIG. 5e is input to the circuit of FIG. 6 at point 60, then FIGS. 7a, 7b, 7c and 7d illustrate the signal at each of the points 61, 62, 63 and 64, respectively. Waveform 75 is the sum of signals 71-74 in FIGS. 7a-7d, produced at output 65 of summer 68. The pattern in each interval T of the signature in FIG. 7e, is $-1, 0, +1, +4, +1, 0, -1$. This is reminiscent the auto-correlation function for the Barker code character $+++-$ of FIG. 2b, which is well-known in the prior art. But, in this function neither the main-lobe nor the side-lobes are triangular pulses. Rather, they are a sequence of rectangular pulses in the four time intervals of duration T, as shown in FIG. 7e. In essence then, the waveform $+0+0+0-$ gives similar performance to the character $+++-$ and the circuit FIG. 6 gives the well known enhancement for selective reception without any ill effect on the radar signature for targets shorter than L. This point is made more clear by FIG. 7f, which shows the signal in FIG. 3e after passing through the circuit of FIG. 6.

Diagrams 81, 82, 83, 84 and 85 in FIGS. 8a-8e show a simplified representation of waveforms 71-75 in FIGS. 7a-7e, respectively, wherein pulses are used to represent the entire pattern of duration T without regard to the particular pattern within each time interval. Hence, FIG. 8e represents both FIG. 7e and 7f while FIG. 8a represents both FIG. 3a and 5a. This pulse representation greatly simplifies the timing diagrams and allows the coarse structure pattern to show up more clearly. So, it will be used in many of the diagrams beyond FIG. 7e.

Figure 9A:
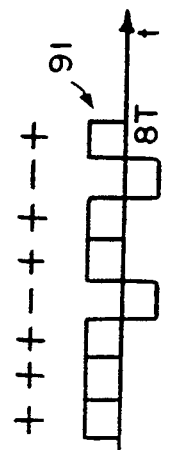
FIG. 9a and 9b show two complementary code characters.
Figure 9B:
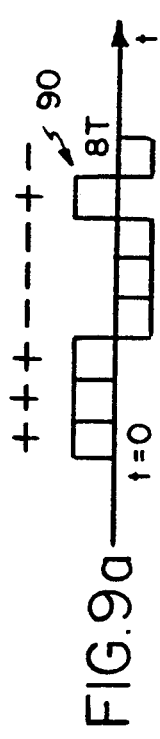
Figure 9C:
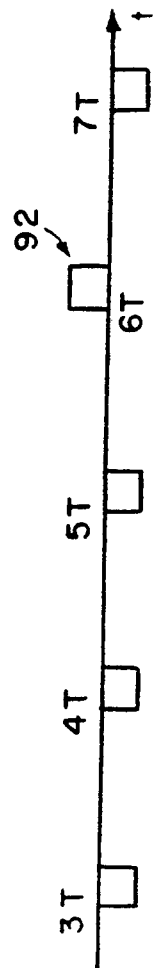
FIGS. 9c and 9e show two representations of the character of FIG. 9a, but with a spacing of $T − \Delta T$ between each pulse.
Figure 9D:
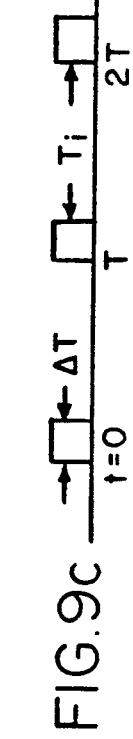
FIGS. 9d and 9f show two representations of the character of FIG. 9b, but with a spacing of $T − \Delta T$ between each pulse.

Up to this point, the Barker code + + + − of FIG. 2b has been the basis for the new waveform (e.g., waveform 31) disclosed herein. Now, consider the two complementary code characters of FIGS. 9a and 9b. If these two time functions are modified by introducing spaces of duration $T_i = T - \Delta T$ between each of the pulses, they become the waveforms of FIGS. 9c and 9d, respectively, which are equivalent to FIGS. 9e and 9f.

Figure 9E:
Figure 9F:
Figure 10:
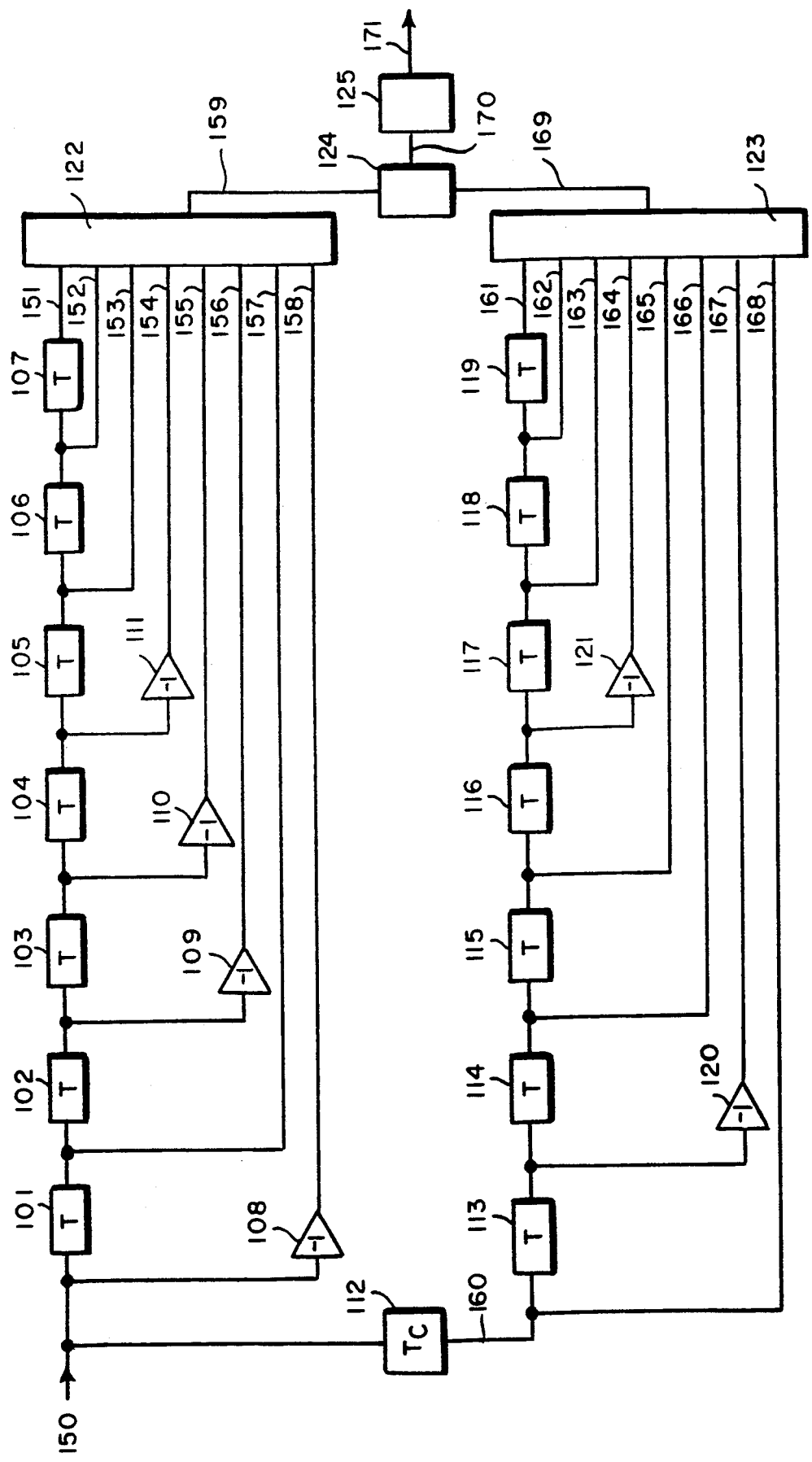
FIG. 10 shows a circuit for selective reception of a radar signal composed of the signals of FIGS. 9c and 9d.

FIG. 10 shows a receiver capable of selectively receiving complementary code character 94 of FIG. 9e delayed by time $T_c$ from character 95 of FIG. 9f. The top half of the circuit is designed to selectively receive character 94 while the bottom half selectively receives character 95. Circuit elements 101–107 and 113–119 are delay circuits with delay T. Circuit elements 108–111 and 120–121 are inverters, and elements 122, 123 and 124 are summing circuits. Element 125 is a Doppler processor. The timing diagrams in FIG. 11-b through FIG. 11-s are the waveforms at points 151–169, respectively.

FIG. 11-a shows the two waveforms of FIGS. 9e and 9f combined such that the second waveform is delayed by $T_c$ relative to the first. The delay time $T_c$ is chosen as follows: First the time $T_i$ is determined as in Eq. (2). If a character with n pulses is chosen, then:

$$T_c \geq n(T_i + \Delta T) = nT \qquad (3).$$

In this example n = 8, and $T_i + \Delta T = 66.7 + 1 = 67.7$ ns. So, $T_c \geq 541.6$ ns.

The signal in FIG. 11-a is fed into the circuit of FIG. 10. We ignore for the moment the processing of the first-arriving character and follow the later arriving character through the circuit in the upper half of FIG. 10. It consists of delay circuits 101 to 107, each with delay T, amplitude reversing amplifiers 108 to 111, and the summing circuit 122. The signals at the input terminals 151–158 of summing circuit 122 are shown in FIG. 11-b through FIG. 11-i and the output signal at terminal 159 of the summing circuit 122 is shown in FIG. 11-j. This is the pattern of the auto correlation function of the character in FIG. 9e.

The first arriving character of the waveform of FIG. 11-a is delayed by interval $T_c$ in delay circuit 112 of FIG. 10, so it arrives at point 160 at the same time as the second character arrives at terminal 150. The signals at the input terminals 161–168 of the summing circuit 123 are shown in FIG. 11-k through FIG. 11-r and the output signal at terminal 169 of summing circuit 123 is shown in FIG. 11-s.

The output of summing circuit 124 is then fed into a Doppler processor 125 to further enhance the signal-to-noise ratio at output point 171.

Figure 12:
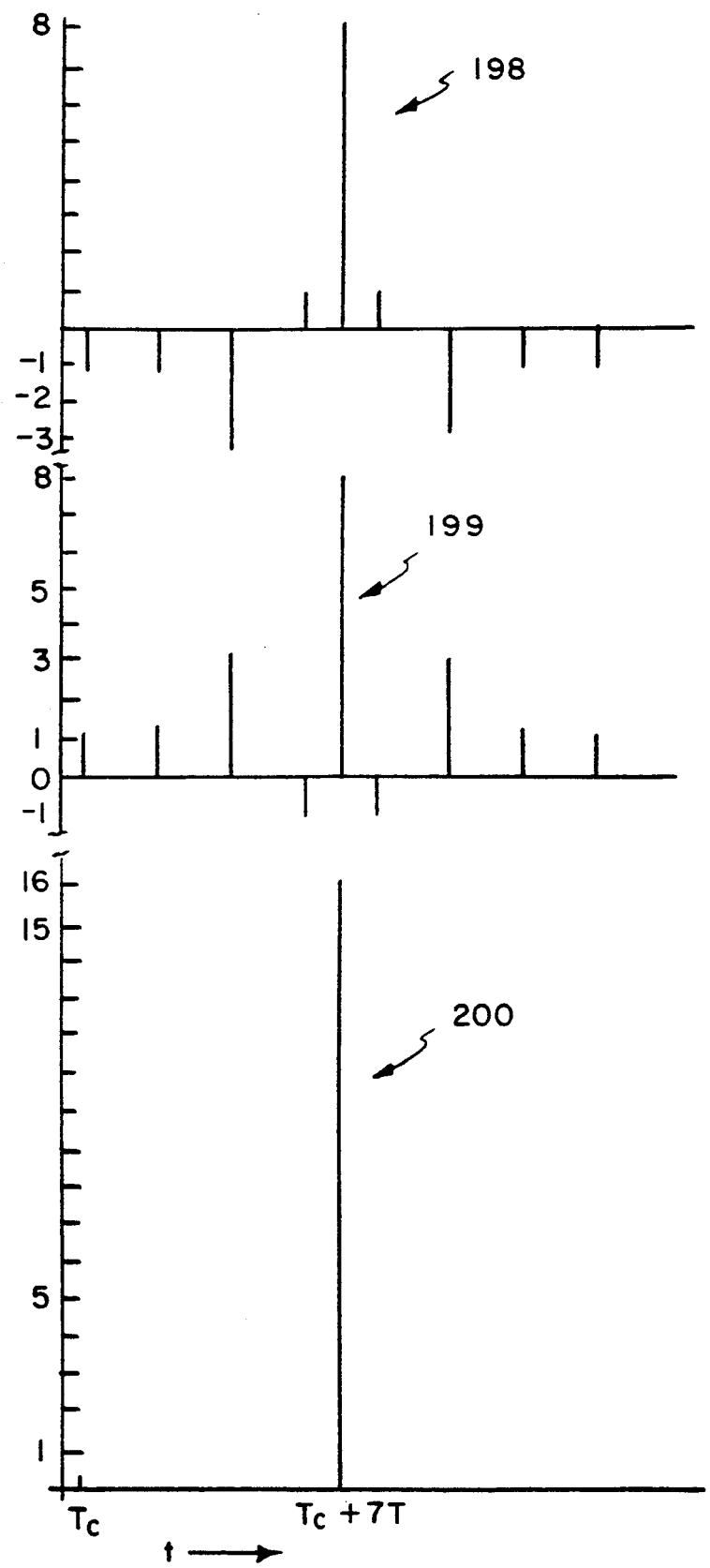
FIG. 12 shows the signal at the outputs of summing amplifiers 122, 123 and 124.

FIG. 12 shows the timing diagram for the three signals of summing circuit 124. The signals 198 and 199 of FIG. 11-j and FIG. 11-s are repeated as the top two waveforms 198 and 199 in FIG. 12 because they are the input signals to summer 124. The bottom plot 200 of FIG. 12 is the sum of the top two waveforms 198 and 199, which is produced at output 170. The side-lobes of waveforms 198 and 199 have disappeared and the main lobe of waveforms 198 and 199 is 16 times larger than the amplitude of the original signal, as would be expected for such processing with prior art complementary code characters.

Figure 13:
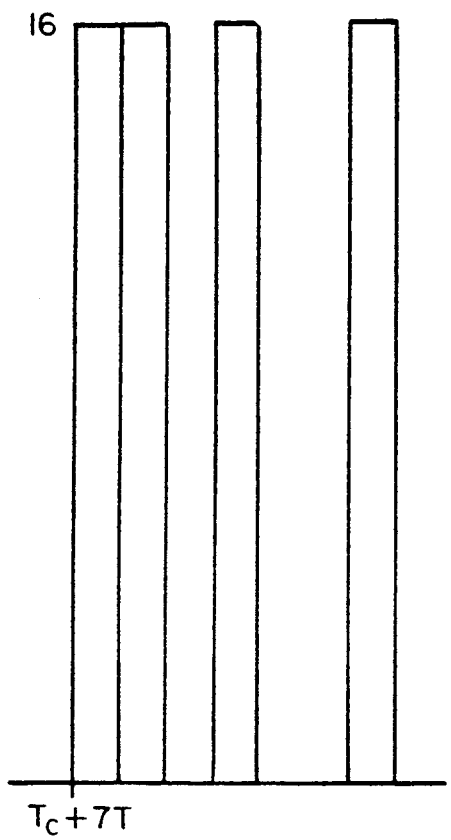
FIG. 13 is a detailed plot of the output of summing amplifier 124.

FIG. 13 shows the actual time function, represented symbolically, if a target according to FIG. 4 returns the wave. The function is the same as that in FIG. 7e in the time interval $3T \leq t \leq 4T$, because the radar signature is independent of the sequence of pulses used for the radiated signal such as shown in FIG. 5a or FIGS. 9e and 9f. The sequence of pulses only permits the selective reception, the radar signature is determined by the target and by the rectangular pulses used to construct the signal.

An explanation must still be given, of what happens to the first character of FIG. 11-a when it passes through the upper half of the circuit in FIG. 10. Since this circuit is set to receive selectively the second character, the output produced by the first character has a much smaller amplitude. In fact, all signals that do not have the pattern the circuit is selectively set to receive will not be enhanced by the circuitry. The output of all such "wrong" signals will be small compared to the signal that the circuit is designed to enhance. Similarly, when the second character in FIG. 11-a passes through the lower half of circuit of FIG. 10, it will produce the output of a wrong signal. This rejection as a wrong signal is not very dramatic if the characters in FIG. 9 consist only of sequences of 8 pulses. However, the rejection becomes very effective if the number of pulses increases to 128, 256, 512, . . . . This is in line with the observation that a resonance filter for sinusoidal waves will not be very selective if the input consists of only eight half-cycles (4 full cycles) but becomes very effective when the number of cycles increases beyond 100.

Figure 14:
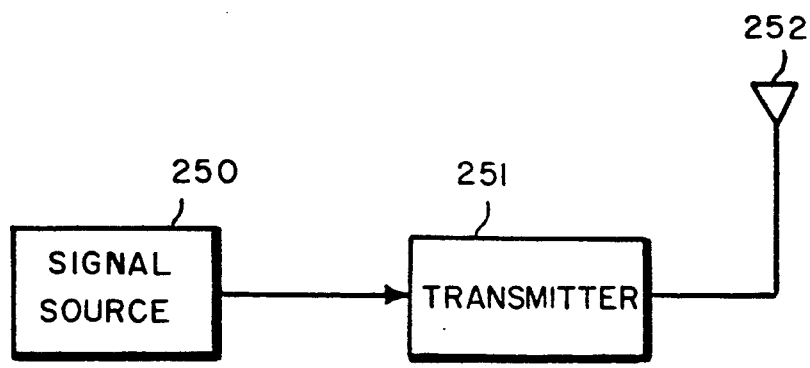
FIG. 14 is a block diagram of a radar transmitter.

FIG. 14 is a block diagram of a transmitter capable of radiating waveforms of this invention into a transmission medium. The signal source 250 generates the signals of this invention as described above and feeds these signals into transmitter 251 and subsequently into antenna 252 which are the transmitting means capable of radiating the short duration electromagnetic pulses of source 250 into the medium.

Although a preferred embodiment of the invention has been set forth in detail, it is to be understood that this is for the purpose of illustrating the invention by way of example only, and should not be construed as limiting the scope of the invention. It is apparent that many changes can be made to the disclosed embodiments, by those skilled in the art, to suit particular applications.

Accordingly, the invention is defined not by the illustrative embodiment(s), but only by the following claims and their equivalents.

What is claimed is:

1. In a radar transmission system having means for transmitting into a medium an electromagnetic signal comprising a plurality of positive-going and negative-going pulses, without a sinusoidal carrier as a fine structure marking, in a pattern of pulses that form a signal with coarse structure marking which is long compared to each of said pulses, the improvement comprising:
   means for supplying to the means for transmitting, a sequence of positive-going and negative-going pulses in a pattern of non-continguous pulses.

2. The radar transmission system of claim 1 comprising:
   means for transmitting a first pattern of non contiguous pulses; and
   means for transmitting a second pattern of non contiguous pulses after the first pattern.

3. The radar system of claim 2 wherein the first and second patterns transmitted in sequence separated by an interval without transmission.

4. The radar transmission system of claim 2 wherein the second pattern is a complementary code pattern of the first pattern.

5. The radar transmission system of either claim 3 or claim 4 wherein the interval is selected such that a delay time from the start of the transmission of the first pattern to the start of the transmission of the second pattern is at least as large as $2L/c$, where L is the largest linear dimension of all targets of interest, and c is the speed of light as measured in the transmission medium.

6. The radar transmission system of claim 1 wherein the total energy of all the non-contiguous pulses that form the signal with coarse structure marking is large enough to assure good all-weather radar transmission with reception at distances exceeding 20 km.

7. A method of forming a radar signal comprising the steps of:
generating positive-going and negative-going pulses without a sinusoidal carrier as a fine structure marking;
generating a first pattern using said pulses to generate a first sequence of non-contiguous positive-going and negative-going pulses;
generating a second pattern using said pulses to generate a second sequence of non-continguous positive-going and negative-going pulses; and
transmitting the first pattern and then after a predetermined interval of time, transmitting the second pattern.

8. The method of forming the radar signal of claim 7 wherein the second pattern is a complementary code pattern of the first pattern.

9. The method of forming a radar signal of either claim 7 or claim 8 wherein the interval is selected such that a delay time between the start of the second pattern and the start of the first pattern is at least as large as $2L/c$, where L is the largest linear dimension of all targets of interest, and c is the speed of light as measured in the transmission medium.

10. The method of forming the radar signal of claim 9 in the transmitter, and further comprising a receiver, wherein the delay between the first and second patterns is sufficient to enable the receiver to selectively suppress clutter in a received signal returned from all targets greater in length than L.

11. The method of claim 7 wherein each pattern is long enough to assure that the total radiated energy is sufficient to assure good all-weather radar transmission for distances exceeding 20 km.

12. A radar receiving system comprising:
means for selectively receiving a first pattern of non-contiguous positive-going and negative-going pulses as a radar signature, without a sinusoidal carrier as a fine structure marking, including means for producing an auto-correlation function of the first pattern to enhance detection of the radar signature and suppress unwanted signals and noise;
means for receiving selectively a second pattern of non-continguous positive-going and negative-going pulses as a radar signature, without a sinusoidal carrier as a fine structure marking, including means for producing an auto-correlation function of the second pattern to enhance detection of the radar signature while simultaneously suppressing unwanted signals and noise; and
means for summing the auto-correlation function of the first pattern with the auto-correlation function of the second pattern to produce an output signal with a ratio of the radar signature signal to the unwanted signals and noise that is greater than the received signal and auto-correlation functions taken individually.

13. The radar receiver of claim 12, wherein the output signal is supplied as an input to a Doppler processor means for further eliminating unwanted signals and noise in the return signal.

* * * * *